United States Patent
Tränk et al.

(10) Patent No.: US 10,623,936 B2
(45) Date of Patent: Apr. 14, 2020

(54) PRIORITY HANDLING FOR DATA FLOW TRANSPORT IN COMMUNICATION SYSTEMS

(71) Applicant: Telefonaktiebolaget LM Ericsson (publ), Stockholm (SE)

(72) Inventors: Magnus Tränk, Lerum (SE); Mikael Persson, Nödinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 15/088,528

(22) Filed: Apr. 1, 2016

(65) Prior Publication Data

US 2017/0099672 A1    Apr. 6, 2017

Related U.S. Application Data

(60) Provisional application No. 62/236,479, filed on Oct. 2, 2015.

(51) Int. Cl.
*H04W 4/00* (2018.01)
*H04W 4/90* (2018.01)
(Continued)

(52) U.S. Cl.
CPC ............. *H04W 4/90* (2018.02); *H04L 12/14* (2013.01); *H04L 12/1403* (2013.01);
(Continued)

(58) Field of Classification Search
CPC ....... H04W 4/90; H04W 76/12; H04W 76/50; H04W 72/10; H04L 47/2458
See application file for complete search history.

(56) References Cited

U.S. PATENT DOCUMENTS 9,554,389 B2 * 1/2017 Anchan ................ H04W 76/40
2009/0016344 A1 1/2009 Hu et al.
(Continued)

FOREIGN PATENT DOCUMENTS

| EP | 2007083 A2 | 12/2008 |
|---|---|---|
| EP | 2800328 A2 | 5/2014 |
| WO | 2012092888 A2 | 7/2012 |
| WO | 2012103503 A1 | 8/2012 |

OTHER PUBLICATIONS

Ericsson, "Group Communication Service support for Unicast bearers", 3GPP Draft, C3-143149_GCSE_214, 3rd Generation Partnership Project (3GPP), Mobile Competence Centre, 650, Route Des Lucioles, F-06921 Sophia-Antipolois Cedex, France, vol. CT WG3, No. Cape Town, South Africa, Jul. 14, 2014-Jul. 18, 2014, Jul. 13, 2014, 13 pages, XP050779032.

(Continued)

*Primary Examiner* — Bo Hui A Zhu
(74) *Attorney, Agent, or Firm* — Rothwell, Figg, Ernst & Manbeck, P.C.

(57) ABSTRACT

A system, method, and network node for priority handling in a communications system are presented. The system comprises one or more data bearers and a priority handling module. Each of the one or more bearers is configured to transport one or more of the data flows. The priority handling module is configured to prioritize between data flows, and is further configured to: receive a request for priority configuration or re-configuration of a first data flow; obtain a priority sharing identifier of the first data flow; identify other data flows in the communication system having the priority sharing identifier of the first transport data flow; and update priority rules associated with the first data flow and also with any other identified data flows in the communication system having the priority sharing identifier of the first transport data flow to agree with a shared priority rule.

19 Claims, 14 Drawing Sheets

(51) Int. Cl.

| | | |
|---|---|---|
| *H04W 76/50* | (2018.01) | |
| *H04W 72/10* | (2009.01) | |
| *H04L 12/14* | (2006.01) | |
| *H04W 76/12* | (2018.01) | |
| *H04L 12/801* | (2013.01) | |
| *H04L 12/851* | (2013.01) | |
| *H04L 12/833* | (2013.01) | |
| *H04M 15/00* | (2006.01) | |
| *H04W 76/15* | (2018.01) | |

(52) U.S. Cl.
CPC .......... *H04L 12/1407* (2013.01); *H04L 47/14* (2013.01); *H04L 47/24* (2013.01); *H04L 47/2458* (2013.01); *H04M 15/66* (2013.01); *H04W 72/10* (2013.01); *H04W 76/12* (2018.02); *H04W 76/50* (2018.02); *H04W 76/15* (2018.02)

(56) References Cited

U.S. PATENT DOCUMENTS

| | | |
|---|---|---|
| 2012/0026880 A1 | 2/2012 | Miller et al. |
| 2013/0136036 A1 | 5/2013 | Chen et al. |
| 2014/0341021 A1 | 11/2014 | Han et al. |
| 2016/0183119 A1 | 6/2016 | Tjandra et al. |

OTHER PUBLICATIONS

International Search Report and Written Opinion dated Jun. 20, 2016 in International application No. PCT/EP2016/057329, 13 pages.

"3rd Generation Partnership Project; Technical Specification Group Services and System Aspects; General Packet Radio Serivce (GPRS) enhancements for Evolved Universal Terrestrial Radio Access Network (E-UTRAN) access (Release 13)", 3GPP TS 23.401, V13.4.0 (Sep. 2015), 334 pages.

"3rd Generation Partnership Project; Technical Specification Group Services and System Aspects; Policy and charging control architecture (Release 13)", 3GPP TS 23.203, V13.5.1 (Sep. 2015), 243 pages.

"3rd Generation Partnership Project; Technical Specification Group Services and System Aspects; Network architecture (Release 13)", 3GPP TS 23.002, V13.3.0 (Sep. 2015), 110 pages.

"3rd Generation Partnership Project; Technical Specification Group Radio Access Network; Evolved Universal Terrestrial Radio Access (E-UTRA); Radio Resource Control (RRC); Protocol specification (Release 12)". 3GPP TS 36.331, V12.7.0 (Sep. 2015), 453 pages.

"3rd Generation Partnership Project; Technical Specification Group Radio Access Network; Evolved Universal Terrestrial Radio Access (E-UTRA) and Evolved Universal Terrestrial Radio Access Network E-UTRAN), Overall description; Stage 2 (Release 13)", 3GPP TS 36.300, V13.1.0 (Sep. 2015), 254 pages.

"3rd Generation Partnership Project; Technical Specification Group Core Network and Terminals; Policy and Charging Control over Rx reference point (Release 13)", 3GPP TS 29.214, V13.3.0 (Sep. 2015), 66 pages.

Huawei, H., "Priority of Default Bearer," Huawei, Hisilicon, Applied Communication Sciences, OEC, SA WG2 Meeting #108 S2-150756, Apr. 13-17, 2015, San Jose del Cabo, Mexico, 7 pages.

Office Action in Japanese patent application No. 2018-513613 dated Mar. 22, 2019, 4 pages. (with English translation).

\* cited by examiner

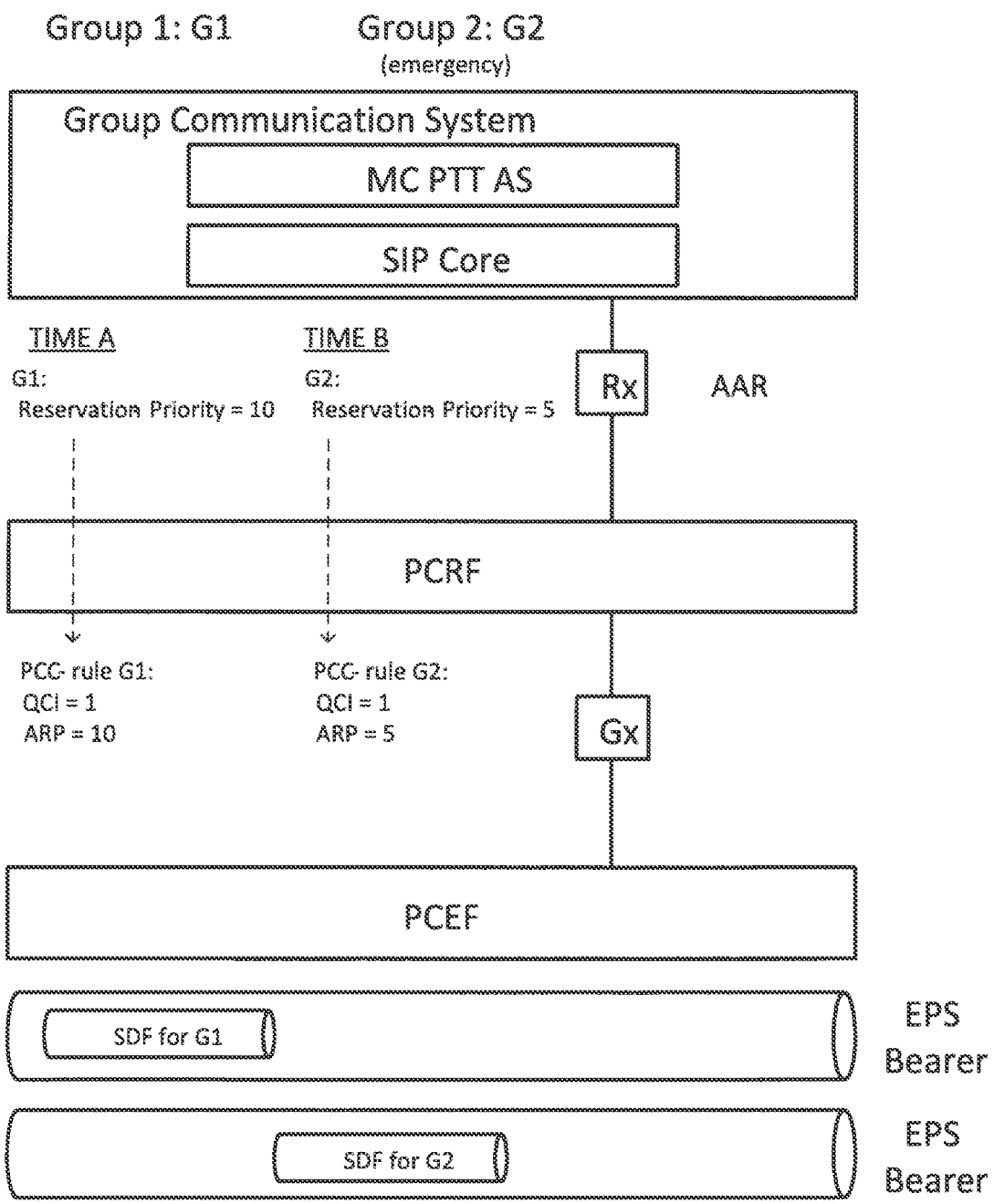
Fig 3b — Prior Art

PRIORITY HANDLING FOR DATA FLOW TRANSPORT IN COMMUNICATION SYSTEMS

RELATED APPLICATIONS

This application claims priority to U.S. Provisional Application No. 62/236,479, filed on Oct. 2, 2015, and entitled "Improved Priority Handling for Data Flow Transport in Communication Systems," the content of which is incorporated herein in its entirety.

TECHNICAL FIELD

Embodiments presented herein relate to priority handling for data flow transport in communication systems. In particular, the disclosure relates to systems, methods, computer programs, network nodes, and messages for priority handling of said data flow transport.

INTRODUCTION

FIG. 1 illustrates a communications network 100 comprising wireless devices 110 connecting wirelessly to an access point 120, such as a radio base station or eNodeB. The access point 120 in turn connects wireless devices to an external network 150, such as a packet data communication network, via a serving gateway (SGW) 130 and a packet data network gateway (PGW) 140.

FIG. 2 illustrates a wireless communication network 200, such as that in FIG. 1, in a 3rd Generation Partnership Project (3GPP) setting. Here, a wireless device 110 connects to an Evolved Packet System (EPS) network according to 3GPP TS 23.002 v 13.3.0. The wireless device uses a virtual connection called EPS Bearer, which terminates in the PGW and enables transport of one or more traffic flows, i.e., Service Data Flows (SDF) according to 3GPP TS 23.203 v 13.5.1. The EPS bearer is carried by a data radio bearer between the wireless device and the access point (120). An EPS Bearer uniquely identifies SDFs that receive a common Quality of Service (QoS) treatment, which includes priority, between a wireless device and a PGW. The Quality of Service as defined in 3GPP TS 23.203 v 13.5.1 includes both a Quality of Service Call Identifier (QCI) and an Allocation and Retention Priority (ARP) attribute. The EPS Bearer is defined in 3GPP TS 23.401 v 13.4.0 and 3GPP TS 36.300 v 13.1.0. It is noted that the EPS bearer forms part of an end-to-end service transport between wireless device 110 and a peer entity which, according to some aspects, is located in the external network 150.

3GPP TS 36.331 v 12.7.0 states that a wireless device only supports a maximum of eight data radio bearers. Three of these data radio bearers can be used in unacknowledged mode (UM), which is the preferred mode for sending real time media traffic, i.e., traffic which preferably is delivered with low latency.

As defined in 3GPP TS 36.300 v 13.1.0 one EPS bearer is established when the wireless device connects to an IP network, such as network 150, and that remains established throughout the lifetime of the connection to the IP network to provide the wireless device with always-on IP connectivity. That bearer is referred to as the default bearer. The default bearer is best effort service and each default bearer comes with an IP address. Any additional EPS bearer that is established to the same IP network is referred to as a dedicated bearer.

Priority is an attribute which, in the setting of FIG. 2, is defined per EPS bearer. The priority is associated with the bearer level parameter Allocation and Retention Priority (ARP) according to 3GPP TS 23.203 v 13.5.1. The priority information of the ARP is used to give EPS bearers having higher priority preference over EPS bearers having lower priority during admission through the communication system 200. The priority attributes are essential for so-called mission critical services as provided by, e.g., Public Safety operators and Public Safety agencies. This is because such services often require low latency and/or high reliability transport. Examples of such mission critical services include police, fire and rescue services, and emergency health care.

According to 3GPP TS 23.203 v 13.5.1, if there is a priority modification requested for a first SDF, which shares the same EPS bearer as other SDFs, the following ensues:
(a) if another EPS Bearer exists with the requested priority and the same Quality of Service (QoS) Class Identifier (QCI) as defined in 3GPP TS 23.203 v 13.5.1 for the first SDF, the first SDF is moved to that EPS Bearer, or
(b) if no other EPS bearer exists with the requested priority and the same QCI, the communication system attempts to create a new EPS bearer for transporting the first SDF, having the requested modified priority parameter.

At least partly due to the limitation on number of EPS Bearers per wireless device, current priority modification behavior is not compatible with mission critical requirements. To see why, consider an example scenario where a wireless device already has three EPS Bearers (UM) established when a priority modification of an SDF is requested. Given that the modified priority is not a-priority defined for an existing EPS bearer with the same QCI; this will result in that a new EPS bearer is requested, i.e., there will be an attempt in the communication system at creating an EPS bearer. As three EPS Bearers already are established, the network will reject the request to create the new EPS Bearer. A direct consequence of this is that the modified SDF will lose connectivity and the application system will receive a notification that resources were not granted. The same sequence of events will of course occur for a request to establish resources for a new SDF having a unique priority configuration not previously in use by any EPS bearer.

Hence, there is a need for improved priority handling in the type of communication networks discussed above. In particular, there is a need for improved priority handling in communication systems used for mission critical services.

SUMMARY

An object of embodiments presented herein is to provide improved priority handling in communication systems.

According to a first aspect there is presented a system for priority handling of data flows in a communications system. The system comprises one or more data bearers, each of which bearer being configured to transport one or more of the data flows. The system also comprises a priority handling module configured to prioritize between data bearers. The priority handling module is configured to receive a request for priority configuration or re-configuration of a first data flow. The priority handling module is also configured to obtain a priority sharing identifier of the first data flow. The priority handling module is further configured to identify other data flows in the communication system having the priority sharing identifier of the first transport data flow. The priority handling module is configured to update priority rules associated with the first data flow and also with any other identified data flows in the communication system having the priority sharing identifier of the first transport data flow to agree with a shared priority rule.

Hereby, a communication system having improved priority handling is provided in that the risk of generating more than the maximum allowable number of data flow bearers is reduced.

For instance, an EPS-based communication system will, by the presented technique, reuse one EPS bearer for communication regardless of each traffic flow's priority needs, as long as the traffic flows have a priority sharing identifier in common. Consequently, the proposed solution limits the probability that the maximum number of EPS bearers is reached, and that connectivity for some SDF is lost due to failure to create additional EPS bearers.

In other words, a solution to address the problem of critical services getting rejected due to, e.g., EPS Bearer limitations in the wireless device is to introduce the possibility to share priority among SDFs associated to the same priority sharing identifier, i.e., sharing a priority identifier.

According to a second aspect, there is presented herein a method performed by a priority handling module in a communication network. The method comprises receiving a request for configuration or re-configuration of a priority rule associated with a data flow in the communications system, wherein the request comprises a priority sharing identifier. The method also comprises calculating priority parameters of the communication system based on the received request, and identifying other data flows in the communication system which are associated with the priority sharing identifier, as well as determining a shared priority parameter based on the request for configuration or re-configuration and on an existing priority configuration of any identified other data flows in the communication system associated with said priority sharing identifier.

According to an aspect, the method also comprises updating a priority configuration related to data flows in the communication system, based on the determined shared priority parameter.

According to some aspects, the priority handling module comprises a Policy and Charging Rule Function (PCRF), of a 3GPP-defined communication system.

According to some aspects, the priority handling module comprises a Policy and Charging Enforcement Function (PCEF) of a 3GPP-defined communication system.

There is also disclosed herein computer programs comprising computer program code which, when executed in a network node of a communication system, causes the communication system to execute a method as disclosed herein.

There is further disclosed herein a network node configured to perform priority handling in a communication network. The network node comprises a receiving module configured to receive a request for configuration or re-configuration of a priority rule associated with a data flow in the communications system, wherein the request comprises a priority sharing identifier. The network node also comprises a calculating module configured to calculate priority parameters of the communication system based on the received request, a data flow identifying module configured to identify other data flows in the communication system which are associated with the priority sharing identifier, and a determining module configured to determine a shared priority parameter based on the request for configuration or re-configuration and on an existing priority configuration of any identified other data flows in the communication system associated with said priority sharing identifier.

The proposed solution is, according to some aspects, based on Policy and Charging Control (PCC). The PCC functionality consists of the Policy and Charging Enforcement Function (PCEF), the Policy and Charging Rules Function (PCRF), and the Application Function (AF). The proposed solution on priority sharing can be implemented in either of PCEF or PCRF, or on a combination of the two.

There is furthermore disclosed herein a modified Authentication/Authorization Request (AAR) message configured for shared priority handling of a number of Service Data Flows (SDF) in a communication system. The modified AAR message comprises a Group Communication Service Identifier (GCS-Identifier) wherein at least part of the GCS-identifier value range defines a priority sharing identifier or a priority sharing key of the communication system.

The methods, computer programs, network nodes, and messages all display advantages corresponding to the advantages already described in relation to the above-mentioned system.

BRIEF DESCRIPTION OF THE DRAWINGS

The present disclosure will now be described in more detail with reference to the appended drawings, where

FIGS. 3a and 3b illustrates an example of priority handling according to prior art;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as being limited to embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
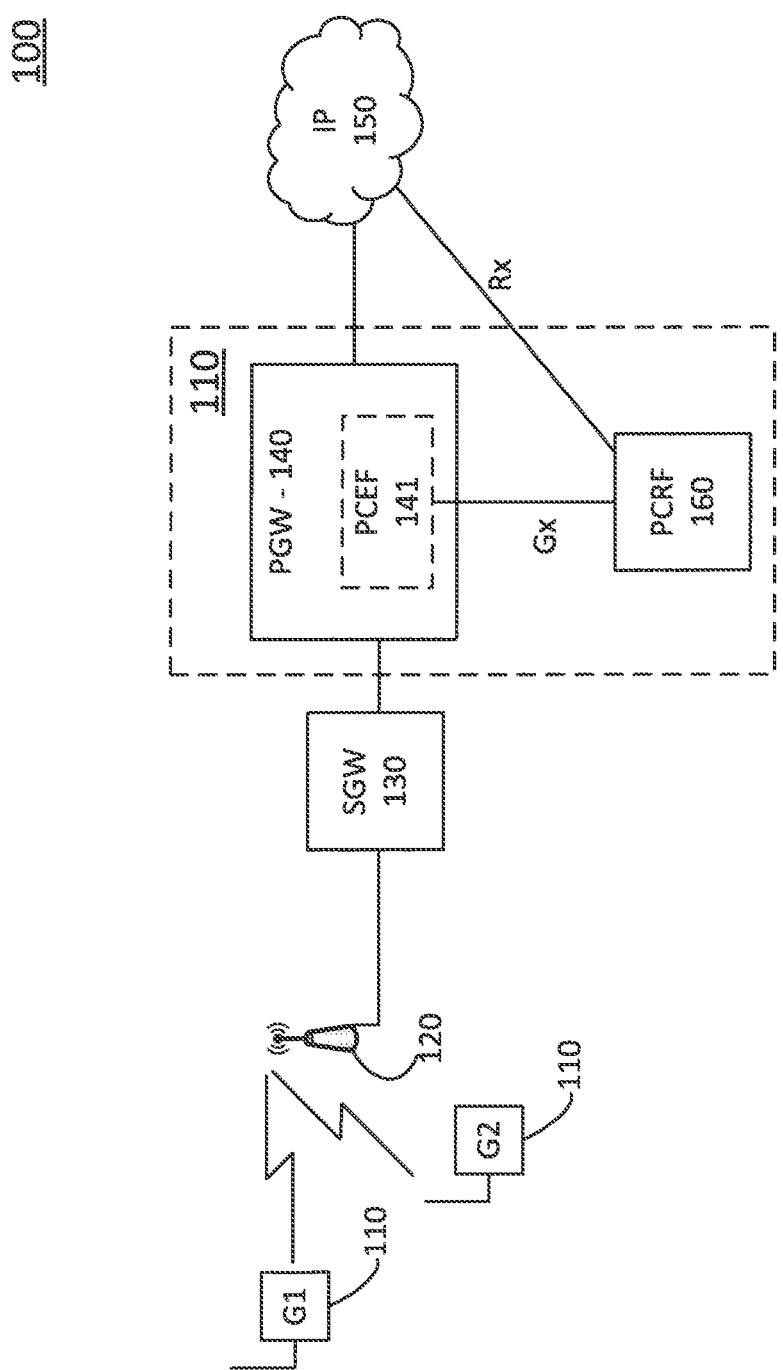
FIGS. 1-2 show schematic views of communications networks.

As discussed above, FIGS. 1 and 2 show schematic views of communications networks 100, 200. Wireless devices 110 are connected to an external network 150 using one or more data flows. One example of such a data flow is a 3GPP SDF. However, the present technique is not limited to that type of data flow but is applicable to a wide range of different types of data flows.

Examples of wireless devices 110 include, but are not limited to, mobile stations, mobile phones, handsets, wireless local loop phones, user equipment (UE), smartphones, laptop computers, and tablet computers. Examples of the access point 120 include, but are not limited to, radio base stations, base transceiver stations, node Bs, evolved node Bs. As the skilled person understands, the communications system 100, 200 may comprise a plurality of access points 120, each providing network access to a plurality of wireless devices 110. The herein disclosed embodiments are not limited to any particular number of access points 120 or wireless devices 110. In this respect it is assumed that the communication system 100, 200 comprises priority handling. Priority handling enables the communication system to give preference to some data flows over other less prioritized data flows. Examples of data flows which are often given increased priority include data flows related to mission-critical communication, as was discussed above.

Herein when discussing priority, priority parameter, or priority value, it is referred to priority in a broad sense. I.e., the concept of giving a data flow having higher priority some type of preferential treatment during transport or storage in the communication system over a data flow with lower priority.

In a 3GPP setting, priority is at least partly specified using the Allocation and Retention Priority (ARP) attribute. The ARP attribute comprises a priority level value between 0-15 (where value 0 is reserved of other use, value 1 provides the highest priority, and value 15 the lowest priority), a Preemption Capability Indicator (PCI) flag and Preemption Vulnerability Indicator (PVI) flag. Herein, priority may refer to any combination of these components of the ARP attribute.

As discussed above, a wireless device, such as a 3GPP-defined UE, is in some cases associated with a limitation with regards to the radio interface in terms of how many data bearers that can be supported simultaneously. In the 3GPP standards referred to above, only three unacknowledged mode data radio bearer (UM DRB) are allowed to be established simultaneously per wireless device.

Push-To-Talk (PTT) and other services such as video and voice-over-LTE (VoLTE) requires or at least prefers the characteristics of a guaranteed bit-rate (GBR) data bearer. Therefore it is likely that all Push-To-Talk related data flows are installed to one of those GBR bearers. Furthermore a GBR bearer for said services requires or at least prefers the characteristics of a UM DRB.

A Mission Critical Push to Talk (MCPTT) Application Server does not have any knowledge of the currently established EPS bearers and how the PCC-rules are evaluated by the PCRF. This results in that, if and when an MCPTT Application Server requests resources for an emergency group communication, the application will not know how traffic flows of the emergency media is actually treated on the network layer with regards to bearer handling.

An emergency group communication will most likely require better priority treatment than currently configured for, e.g., VoLTE. The PCRF will therefore most likely evaluate the PCC-rule with a better ARP, i.e., higher priority, than for the other group communication traffic flows. As a direct result of this the PCEF will attempt to create a new dedicated EPS bearer for the emergency group communication, given that no EPS bearer having the requested characteristics already exists.

If already three EPS bearers (UM) are established at the time an emergency group communication is requested, this request for additional bearer will be rejected by the network, or communication system, because the maximum number of EPS bearers (UM) are already established. This is of course not acceptable for many mission critical services, which rely on swift and reliable connections. Suffering lost connectivity due to dropped EPS bearers may have severe consequences for mission critical applications.

A solution to this problem, detailed below, is to introduce the concept of priority sharing between data flows. According to this novel concept, a data flow may be associated with a priority sharing identifier or priority sharing identity. This priority sharing identifier acts like a key and links the data flow to other data flows having the same key. Data flows sharing priority then form a set of data flows. This set of data flows will be given a common treatment in the communication system when it comes to priority. An effect of this is that data flows will not be assigned to new EPS bearers if the data flow is currently allocated to an EPS bearer where other data flows having the same priority sharing identifier is transported.

To exemplify, consider the following two example scenarios where the concept is put to use:

(i) Suppose a first data flow is associated with a first priority sharing identifier, and is transported by a first EPS bearer and that the maximum number of EPS bearers has been allocated. Suppose also that a second data flow is introduced having the first priority sharing identifier. This second data flow will then be allocated to the first EPS bearer regardless of the priority settings of the first and the second data flow. In case the first data flow has a lower priority than the second, its priority will be increased to match that of the second data flow. If the second data flow has a priority below that of the first data flow, its priority will be increased to match that of the first. In both cases the two data flows will be given a common priority treatment due to the common priority sharing identifier. If priority sharing applies the priority of the default bearer is also increased to match that of the second data flow.

(ii) Suppose a first and a second data flow are configured to have the same priority, and also have the same priority sharing identifier, and that they are both allocated to a first EPS bearer. Suppose also that the priority level of the second data flow is re-configured to be increased. In this case, the priority level of the first data flow is also increased to again match that of the second data flow, which means that the two data flows can still be transported in the same EPS bearer. If priority sharing applies the priority of the default bearer is also increased to match that of the second data flow.

Hence, data flows, e.g., SDFs, having a priority sharing identifier in common are gathered together and given a common priority treatment, regardless of the actual per SDF configured priority value, which means that they can be allocated into the same EPS bearer.

In a normal scenario with no emergency activities all group communication sessions which a user is listening to experience the same priority treatment. Hence they are all carried by the same EPS bearer. If there is a request for an emergency session, the priority of this session will most likely be elevated to secure that the data flow is prioritized during transport in the network. The EPS system will in such scenarios adjust the EPS bearer to match the priority of the emergency service requiring the best priority. This results in that the PCC-rules for other group communication sessions are adjusted to also match the elevated priority.

Further details and examples of this technique will be given below.

One aspect of the solution presented herein is the possibility for the EPS system to enable a mechanism to gather all Push-To-Talk related traffic flows, and/or mission critical related service data flows, into one dedicated EPS bearer with GBR characteristics with a shared priority treatment. This will lead to a more effective bearer utilization and thereby free up EPS bearers for other services' traffic flow.

The priority sharing identifier or priority sharing key is, according to some 3GPP-related aspects of the inventive concept, an identifier provided by the application within the Group Communication Service Identifier (GCS-Identifier) parameter on the Rx interface. For example, a sub-range of the GCS-Identifier parameter space may be reserved for priority sharing identifier function. The GCS-Identifier parameter is defined in 3GPP TS 29.214 v 13.3.0.

Of course, other possibilities exist for defining and communicating the priority sharing identifier, as long as the priority sharing identifier allows a priority handling system to obtain a priority sharing identifier for a given data flow, and to identify other data flows in the communication system having the same priority sharing identifier so that the data flows can be transported with the same priority configuration and be treated as one entity with regards to priority.

An application, for example Push-to-Talk (PTT), will, according to some aspects, provide the same priority sharing identifier for all PTT-related SDFs associated with a given wireless device or group of wireless devices. SDFs with the same priority sharing identifier will be treated together as a single unit with regards to priority handling. The result following a modification of the priority to the better is that the EPS system adjusts all SDFs with the same priority sharing identifier for a wireless device to that of the modified one, and adjusts the priority of the default bearer to same level as the modified SDF.

The proposed solution is, according to some aspects, based on Policy and Charging Control (PCC), which is defined in 3GPP TS 23.203 v 13.5.1. The PCC functionality consists of the Policy and Charging Enforcement Function (PCEF), the Policy and Charging Rules Function (PCRF), and the Application Function (AF). The proposed solution on priority sharing can be implemented in either of PCEF or PCRF, or on a combination of the two.

Figure 2:
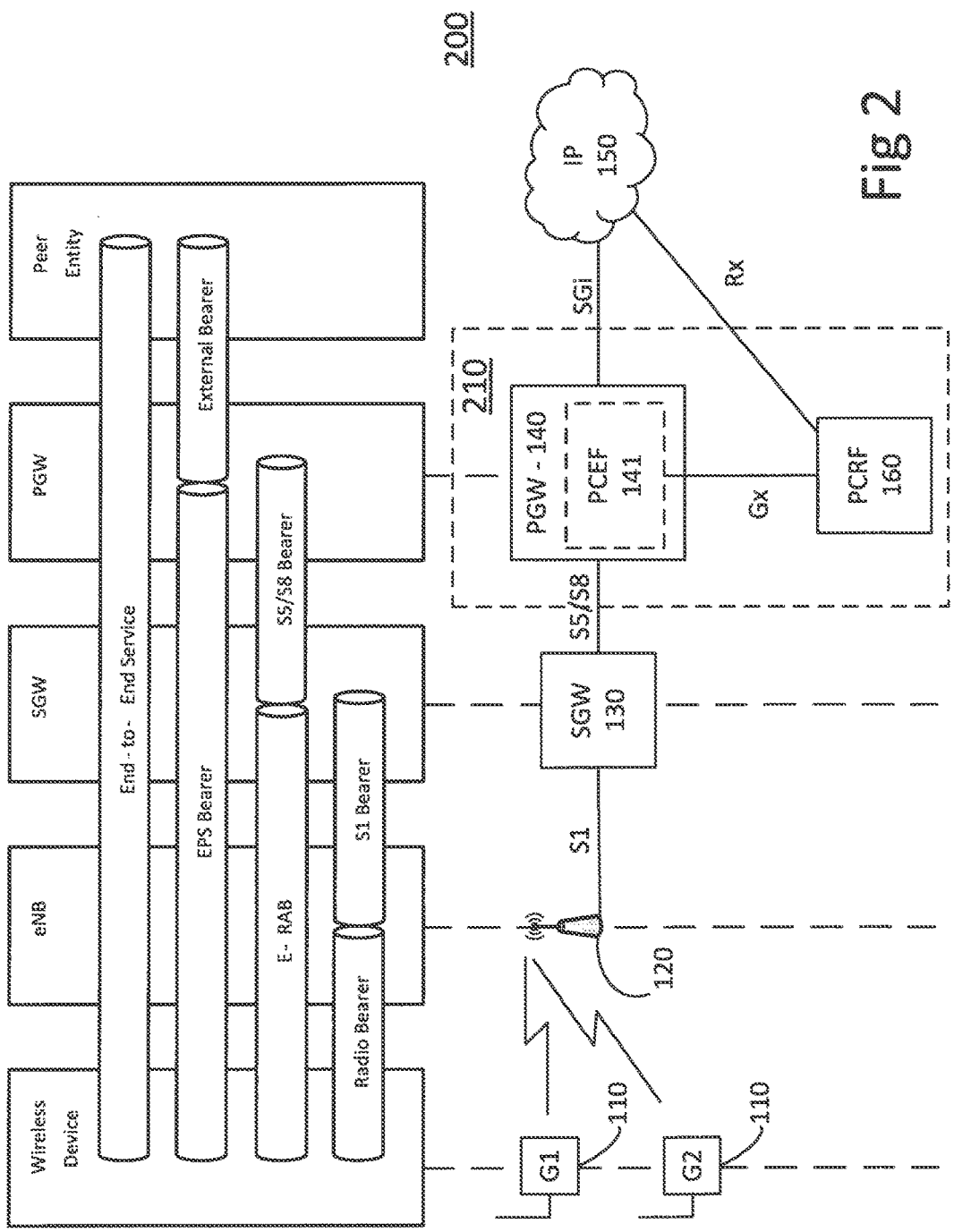

In a 3GPP group communication application such as PTT a request for resources is sent on the Rx interface from an application function (AF) to the PCRF, see, e.g., FIG. 2. The PCRF evaluates the request and calculate or determines the priority (ARP) that shall be applied.

Examples of priority handling according to prior art will now be given in connection to FIGS. 3a and 3b, following which the inventive concept will be discussed.

Figure 3A:
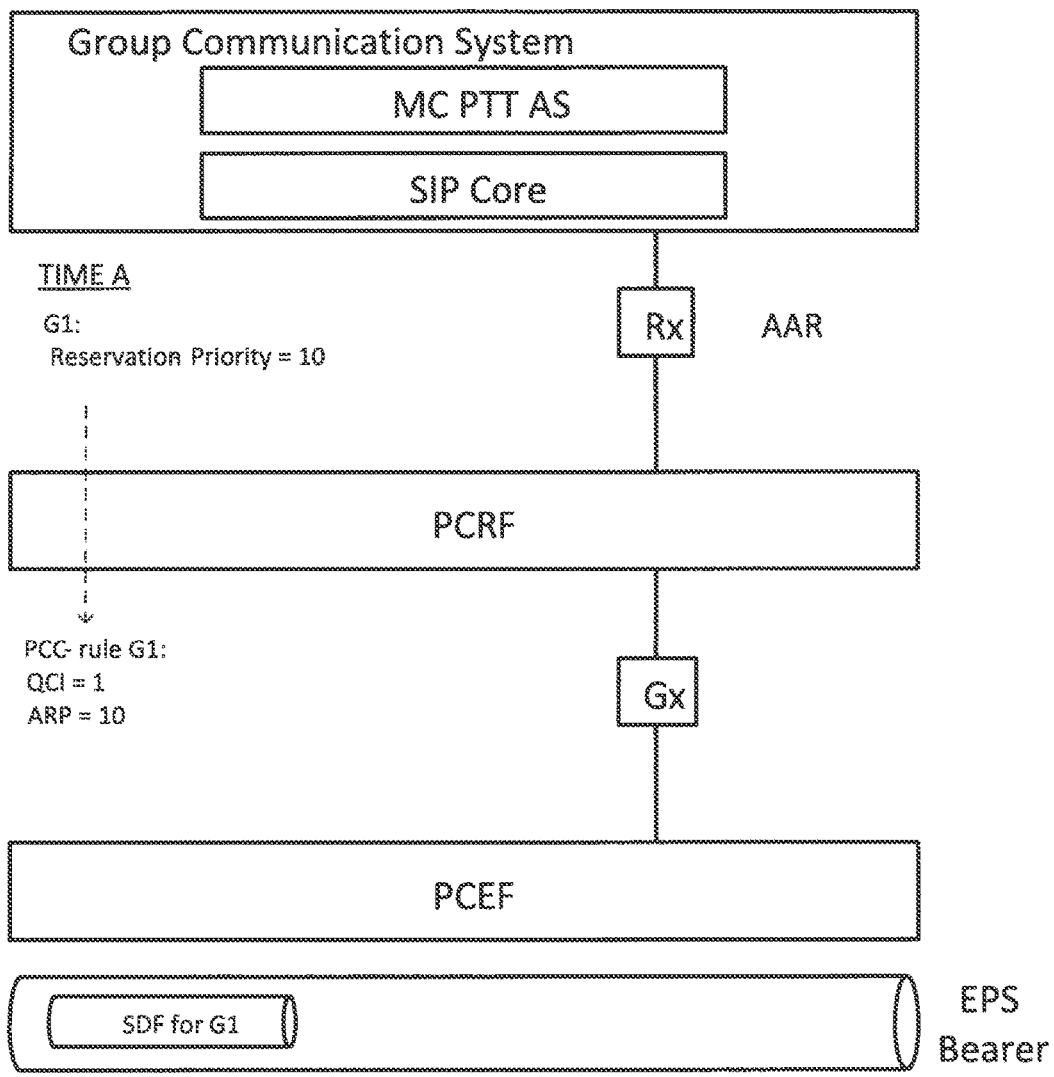

With reference to FIG. 3a, an application requests for resources for a group G1 at time A by sending an Authentication/Authorization Request (AAR) message over the Rx interface to the PCRF according to 3GPP TS 29.214 v 13.3.0. The PCRF then proceeds to communicate with the PCEF over the Gx interface, whereupon an EPS bearer is set up to accommodate SDF for G1.

In FIG. 3a, the group communication system is shown to comprise a Mission Critical (MC) FTT Application Server (AS), i.e., an MCPTT server, and a Session Initiation Protocol (SIP) core.

Now, with reference to FIG. 3b, the same or a different application requests, at time B, resources for a second group, G2, which group G2 is associated with a mission critical application. The group G2 therefore requests a higher priority, i.e., a priority value of 5 in the example (reservation priority=5). The PCRF therefore calculates a Quality of Service Class Identifier (QCI) and ARP for G2 (QCI=1, ARP=5) which is different from that of G1 (QCI=1, ARP=10). Therefore, SDF for G1 and SDF for G2 will be transported in different EPS bearers, illustrated in FIG. 3b as two separate EPS bearers.

Consequently, as discussed above, there is a risk in FIG. 3b that the new EPS bearer cannot be created due to the above-mentioned limitation on the number of EPS bearers.

Figure 4:
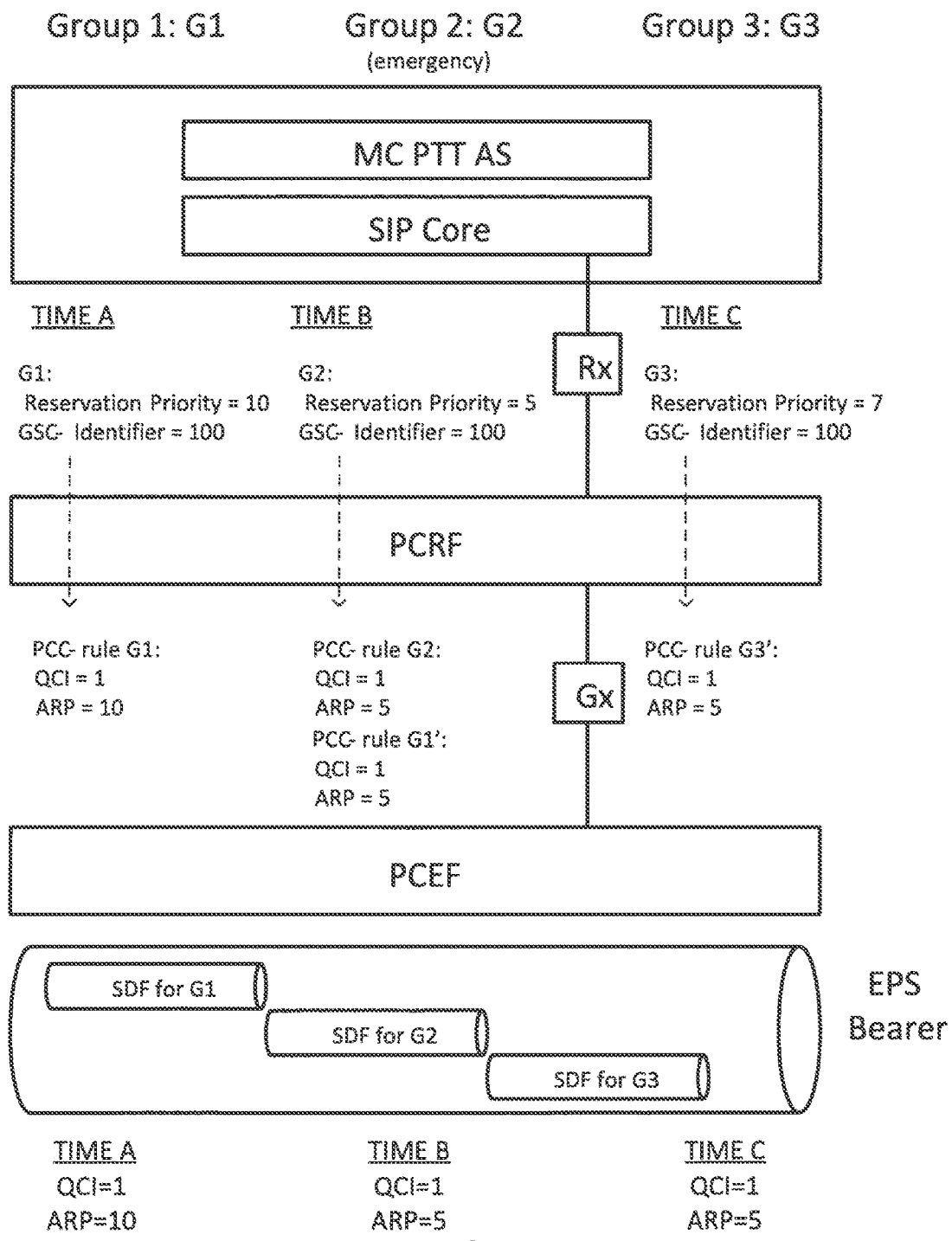
FIG. 4 illustrates examples of priority handling according to aspects of the disclosure.

With reference to FIG. 4, a solution to the above problem is schematically illustrated according to the present inventive concept. In the example of FIG. 4, an SDF for a group G1 is assumed to exist at time A, followed by addition of a new group G2 at time B, followed by yet another group G3 at time C.

Here, an application requests for resources by sending an AAR message over the Rx interface to the PCRF according to 3GPP TS 29.214 v 13.3.0. It could be resources for a new SDF or modified resources for an existing SDF. This message includes a priority sharing identifier within the GCS-Identifier parameter. The PCRF performs session binding as described in 3GPP TS 29.213 v 13.3.0, which is a process to find the user and Access Point Name (APN), 3GPP TS 23.003 v 13.3.0, to which the request applies. The PCRF uses the information received from the application to evaluate the PCC-rules, 3GPP TS 23.203 v 13.5.1. The PCC-rule contains the information that is required to enable the user plane priority and QoS control.

If the PCRF holds the logic of priority sharing according aspects of the present inventive concept, the PCRF will, according to aspects, do the following:
    (a) The PCRF will analyze the AAR information and look at the GCS-Identifier to see if it is marked for priority sharing. A request marked with a priority sharing identifier implicitly instructs the PCRF to look for other SDFs with the same priority sharing identifier, or priority sharing key. In the example of FIG. 4, to look for other SDFs with GCS-identifier=100. If the requested priority of the new request is elevated compared to current configuration, the PCRF will modify all PCC-rules associated with same priority sharing identifier to the highest level of priority among the SDFs. If the requested priority of the new request is elevated compared to current configuration, the PCRF will modify the priority of the default bearer to the highest level of priority among the SDFs. If the priority of the requested SDF is lower than already existing SDFs the new SDF will receive a higher priority as it shares the same priority sharing key as the other SDFs.
    (b) The PCRF may, according to aspects, respond with an Authentication/Authorization Answer (AAA) message.

In the example of FIG. 4, when group G2 is introduced at time B, it is introduced with a priority sharing identifier equal to that of existing group G1 (GSC-Identifier=100). Thus, group G1 having a higher ARP priority level value, i.e., a lower priority, is re-configured into the same priority configuration as new group G2. This means that no new EPS bearer is created since the PCEF is notified that G1 and G2 have the same PCC rule (QCI=1, ARP=5), and both SDFs of groups G1 and G2 are allocated to a shared EPS bearer, as illustrated in FIG. 4.

A consequence of the re-configuration of group G1 during introduction of group G2 is that the configuration of the EPS bearer changes from QCI=1, ARP=10, to a new configuration of QCI=1, ARP=5.

Furthermore, the example of FIG. 4 shows the introduction of new group G3 at time C. This group is associated with priority value 7 and has the same priority sharing identifier as existing groups G1 and G2. Even though priority value 7 is higher than the currently configured ARP value of the EPS bearer, the SDF for G3 is given ARP-value 5 and placed in the same bearer, as shown in FIG. 4.

A consequence of the priority re-configuration of group G3 is that the configuration of the EPS bearer does not change, i.e., it stays at QCI=1, ARP=5.

Thus, it can be seen that due to the present concept of using priority sharing identifiers, and calculating new PCC-rules based on existing and requested priority parameter, new EPS bearers are not allocated to accommodate the different SDFs. Consequently, improved priority handling is provided.

Figure 5:
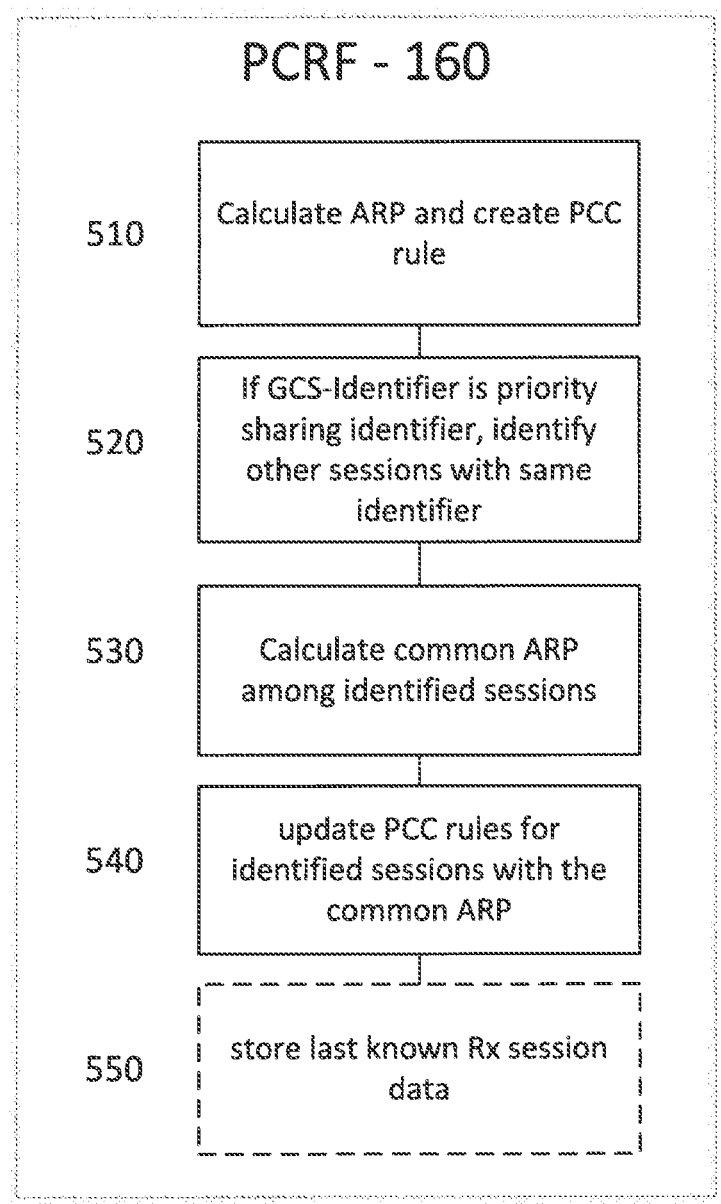
FIG. 5 shows a flowchart illustrating methods performed by a PCRF according to aspects of the present disclosure.

FIG. 5 shows a flowchart illustrating methods according to aspects of the present disclosure where priority sharing mechanisms are performed at least partly by PCRF. Following a request for resources sent over Rx from the application function to the PCRF, the method comprises The PCRF calculating 510 ARP based on input on Rx. A new PCC rule is created.

If GCS-Identifier was provided that is a priority sharing identifier, identifying 520 other sessions having the same identifier.

Calculating 530 a common ARP (usually the lowest priority value ARP) for the identified sessions in the previous step.

Updating 540 all relevant PCC-Rules with the common value of ARP.

Optionally, storing 550 Rx request information to be able to go back to previous ARP value if the session with better ARP is terminated.

Figure 6:
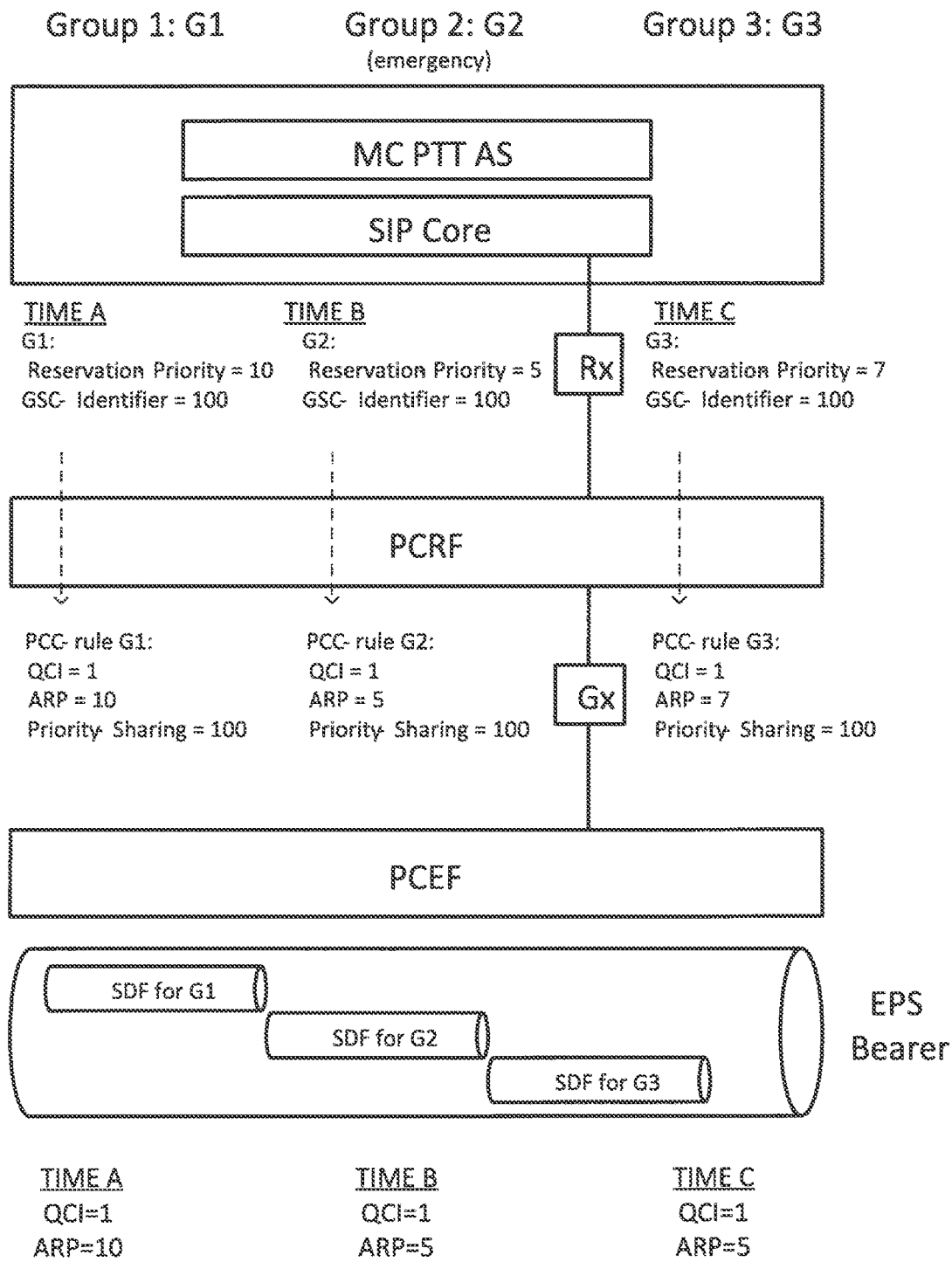
FIG. 6 illustrates examples of priority handling according to aspects of the disclosure.

Turning now to FIG. 6, which illustrates aspects of the inventive concept involving mainly the PCEF 141 instead of the PCRF 160 as was the case in the example of FIG. 4. If the PCEF holds the logic of priority sharing the PCEF will do the following:

(a) The PCEF receives the new or modified PCC-rule associated to an SDF from the PCRF over Gx interface. The PCC-rule contains a new Priority-Sharing parameter, or priority sharing identifier, with the purpose to inform the PCEF that the new priority rule is associated to an SDF applying priority sharing.

(b) The PCEF analyzes the installed PCC-rules for the user and APN to see if other SDFs are subject for priority sharing. They are if they hold the same value of the new Priority-Sharing parameter.

(c) The PCEF then proceeds to adjust the priority of all SDFs having the same priority sharing value or priority sharing identifier to the highest level of priority (usually the lowest priority value ARP) among said SDFs. The PCEF also adjusts the priority of the default bearer to the highest level of priority among said SDFs.

Thus, again, it can be seen that due to the present technique of using priority sharing identifiers, new EPS bearers are not allocated to accommodate the different SDFs. This is illustrated in FIG. 6 by the single EPS bearer transporting SDF for G1-G3, even though the requested priorities are different for G1-G3. Consequently, improved priority handling is provided.

A consequence of the proposed solutions is that the risk of creating an additional bearer at a priority change is eliminated or at least reduced considerably.

According to some aspects, it is proposed to use the GCS-Identifier parameter, which is defined in the Rx interface specification in TS 29.214 v 13.3.0, for priority sharing identification. The GCS-Identifier can, according to such aspects, be used as a key to identify all group communication sessions or SDFs that should share the same priority treatment.

Further examples of the above will be given in connection to FIG. 12 below.

Figure 7:
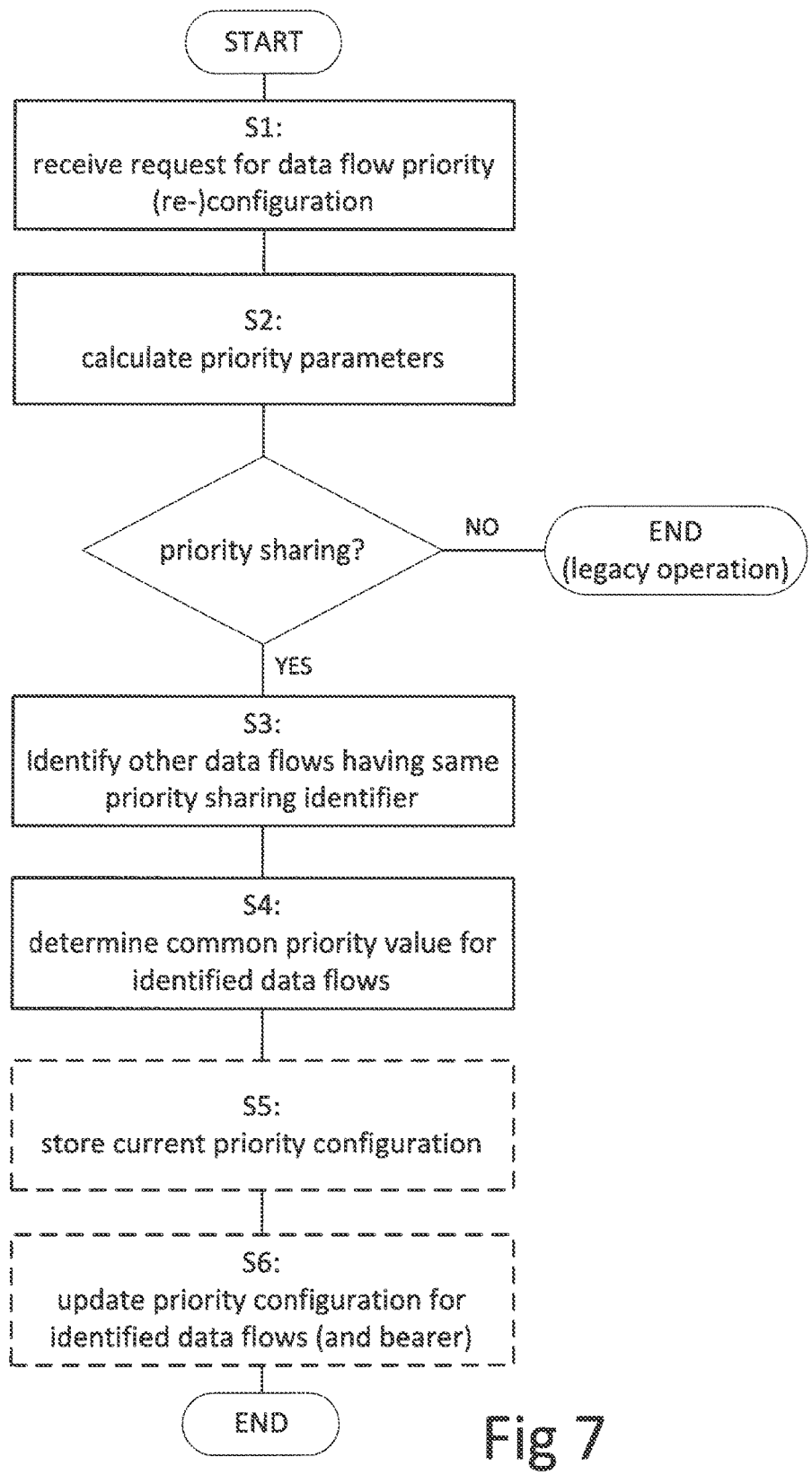
FIGS. 7-9 show flowcharts illustrating methods according to aspects of the present disclosure.

FIG. 7 shows a flowchart illustrating methods according to aspects of the present disclosure.

In particular, there is illustrated a method 700 performed by a priority handling module 110, 210 in a communication network 100, 200. The method comprise receiving S1 a request for configuration or re-configuration of a priority rule associated with a data flow in the communications system, the request comprising a priority sharing identifier. This request was exemplified in connection to FIGS. 4 and 6. An example of where such a request is generated is for instance if an application enters into mission critical status and therefore requests that associated SDF be given a higher priority. Another example of where such a request is generated is for instance if an application enters away from mission critical status and therefore requests that associated SDF be given a lower priority.

The method 700 also comprises calculating S2 priority parameters of the communication system based on the received request. I.e., in the examples of FIGS. 4 and 6, the ARP parameter.

The method further comprises identifying S3 other data flows in the communication system which are associated with the priority sharing identifier. This is one key behind the present inventive concept. By the identifying, the communication system is able to group data flows having a common priority sharing identifier, and given them a uniform treatment as regards priority.

The method also comprises determining S4 a shared priority parameter based on the request for configuration or re-configuration and on an existing priority configuration of any identified other data flows in the communication system associated with said priority sharing identifier. This determining is where the uniform treatment of data flows with respect to priority happens. The shared priority parameter was exemplified in FIGS. 4 and 6 by the lowest ARP parameter which gives the highest priority. However, the present technique is by no means limited to this particular shared priority parameter. On the contrary, any priority policy can be applied to assign priority values to the data flows having a priority sharing identifier in common. For instance Preemption Capability Indicator (PCI) flag and Preemption Vulnerability Indicator (PVI) flag can form part of the shared priority parameter, with or without the actual priority level value of the ARP.

According to aspects, the method also comprises storing S5 a current priority configuration relating to data flows in the communication system. One reason for such storing is to be able to retrace priority configuration back to a previous configuration. If a track record of priority configurations is available, then a previous configuration can be re-loaded when a scenario occurs which requires a previously used priority configuration to be used in the communication system.

According to aspects, the method further comprises updating S6 a priority configuration related to data flows in the communication system, based on the determined shared priority parameter. This updating is the actual application of the determined priority configuration based on the priority sharing concept. It is noted that this updating may or may not be performed by the same node or computational module which performed other parts of the method illustrated in FIG. 7.

Figure 8:
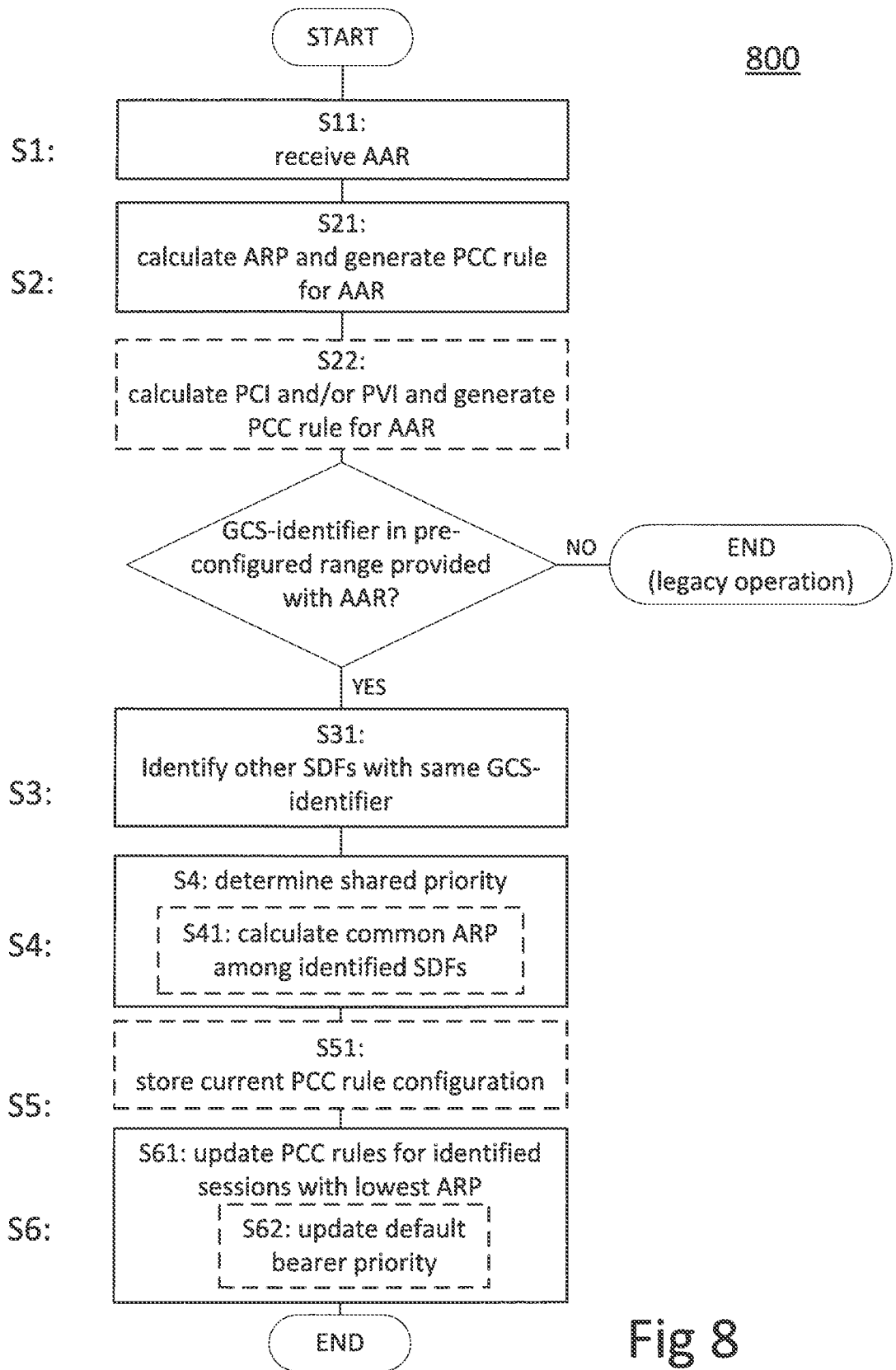

FIG. 8 shows a flowchart illustrating methods according to aspects of the present disclosure.

In particular, aspects of the method shown in FIG. 7 are illustrated where parts of the method are performed in a PCRF of the communications system. An example was given in connection to FIG. 4 of a case where the PCRF was involved in the priority handling process.

Thus, according to aspects 800, the priority handling module comprises a Policy and Charging Rule Function, PCRF, of a 3GPP-defined communication system.

According to aspects, the receiving S1 comprises receiving S11 and Authentication/Authorization Request, AAR related to a service data flow, SDF, having a priority sharing identifier given by a Group Communication Service, GCS, identifier. This AAR message was discussed, e.g., in connection to FIG. 4, and is also discussed in connection to FIG. 11 below.

According to aspects, the calculating S2 comprises calculating S21 Allocation and Retention Priority, ARP.

According to aspects, the calculating S2 comprises calculating S22 Preemption capability, PCI, and/or Preemption Vulnerability, PVI, and generating a Policy and Charging Control, PCC, rule for the received AAR.

According to aspects, the identifying S3 comprises identifying S31 other SDFs in the communication system having the same priority sharing identifier.

According to aspects, the determining comprises calculating S41 a common Allocation and Retention Priority, ARP, among identified SDFs having the same GCS-identifier. This could, for instance, mean that the priority level of the ARP is calculated.

According to aspects, the method 800 comprises updating S61 PCC rules for identified SDFs by the calculated lowest priority value.

According to aspects, the method 800 further comprises storing S51 a current PCC rule configuration of the communication system.

Figure 9:
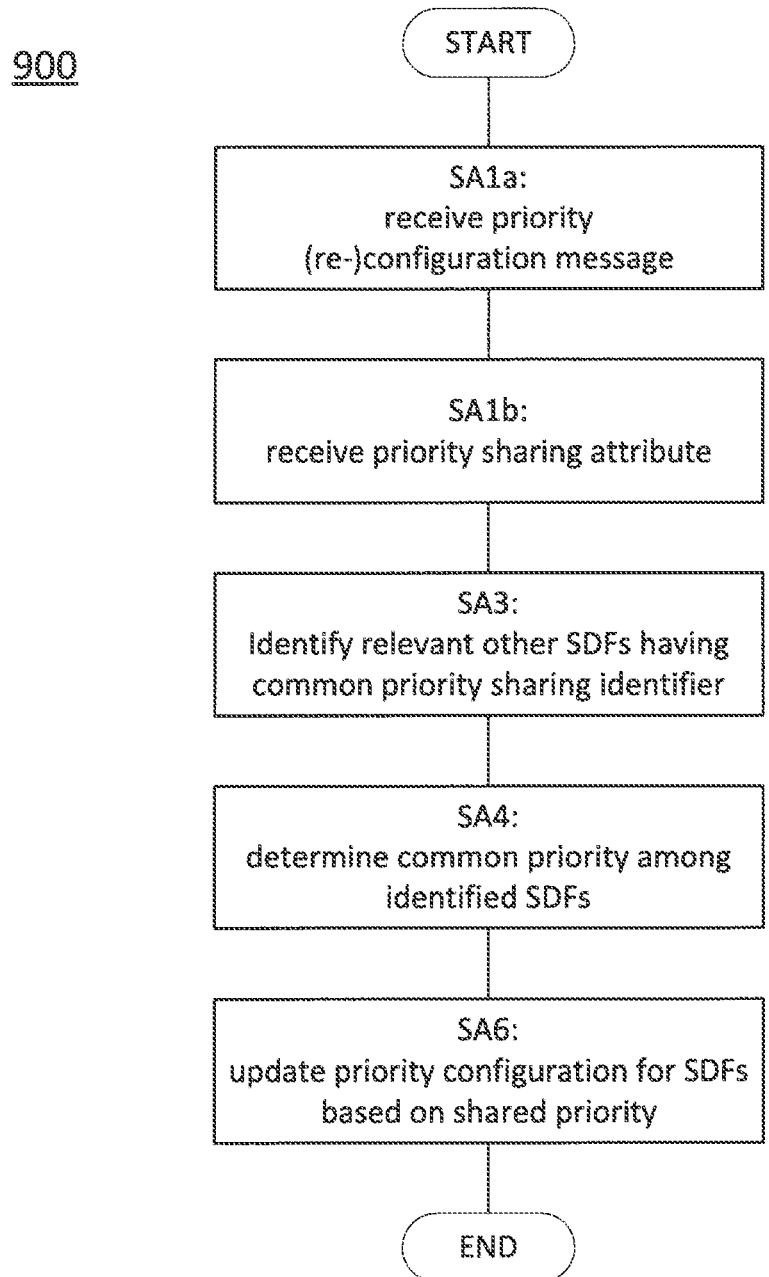

FIG. 9 shows a flowchart illustrating methods according to aspects of the present disclosure.

In particular, aspects of the method shown in FIG. 7 are illustrated where parts of the method are performed in a PCEF of the communications system. An example was given in connection to FIG. 6 of a case where the PCEF was involved in the priority handling process.

Thus, according to aspects 900, the priority handling module comprises a Policy and Charging Enforcement Function, PCEF, of a 3GPP-defined communication system.

According to aspects, the receiving SA1a comprises receiving a priority configuration or re-configuration message from a PCRF.

According to aspects, the method 900 comprises receiving SA1b a priority sharing attribute associated with the configuration or re-configuration message.

According to aspects, the identifying comprises identifying SA3 other SDFs in the communication system having the priority sharing attribute.

According to aspects, the determining comprises determining SA4 a shared priority among the identified SDFs having the priority sharing attribute.

According to aspects, the method 900 comprises updating SA6 priority configuration for SDFs based on shared priority.

Figure 10:
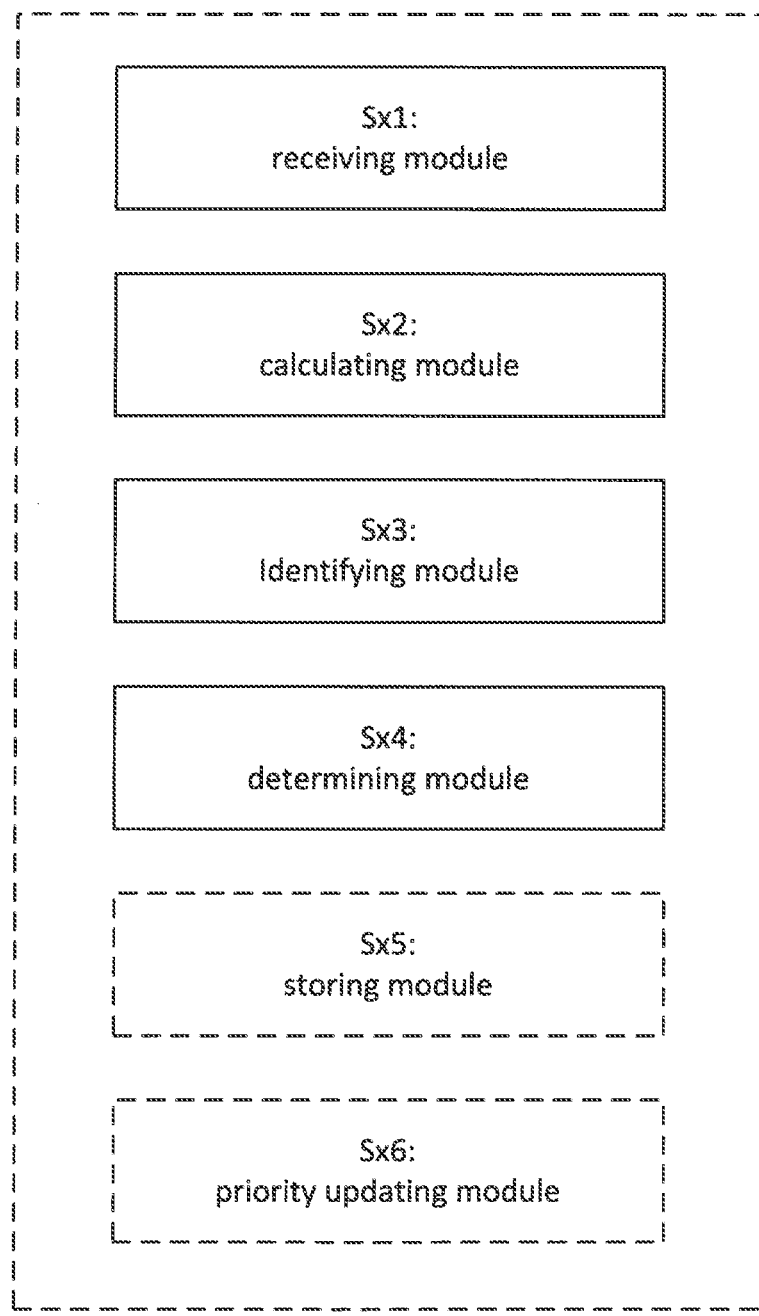
FIG. 10 schematically illustrates a network node according to aspects of the present disclosure.

FIG. 10 schematically illustrates a network node according to aspects of the present disclosure. In particular, there is illustrated a network node 1000 configured to perform priority handling in a communication network 100, 200. The network node comprises:

a receiving module Sx1 configured to receive a request for configuration or re-configuration of a priority rule associated with a data flows in the communications system, the request comprising a priority sharing identifier, a calculating module Sx2 configured to calculate priority parameters of the communication system based on the received request, a data flow identifying module Sx3 configured to identify other data flows in the communication system which are associated with the priority sharing identifier, and a determining module Sx4 configured to determine a shared priority parameter based on the request for configuration or re-configuration and on an existing priority configuration of any identified other data flows in the communication system associated with said priority sharing identifier.

According to aspects, the network node is arranged to execute a Policy and Charging Rules Function, PCRF.

According to aspects, the network node is arranged to execute a Policy and Charging Enforcement Function, PCEF.

Figure 11:
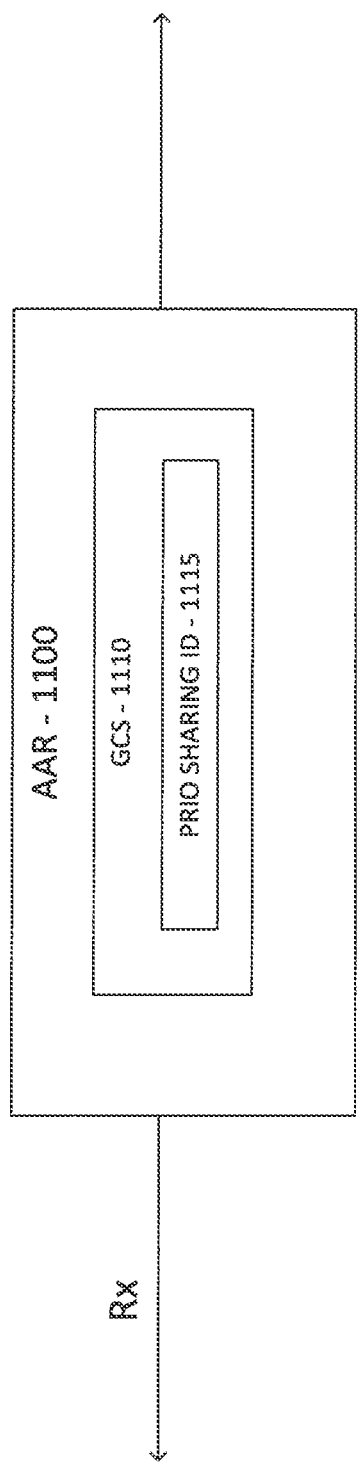
FIG. 11 schematically illustrates a modified Authentication/Authorization Request (AAR) message according to aspects of the present disclosure.

FIG. 11 schematically illustrates a modified Authentication/Authorization Request, AAR, message 1100 configured for shared priority handling of a number of Service Data Flows, SDF, in a communication system, the modified AAR message comprising a Group Communication Service Identifier 1110 (GCS-Identifier) wherein at least part of the GCS-identifier value range defines a priority sharing identifier 1115 or a priority sharing key.

Figure 12:
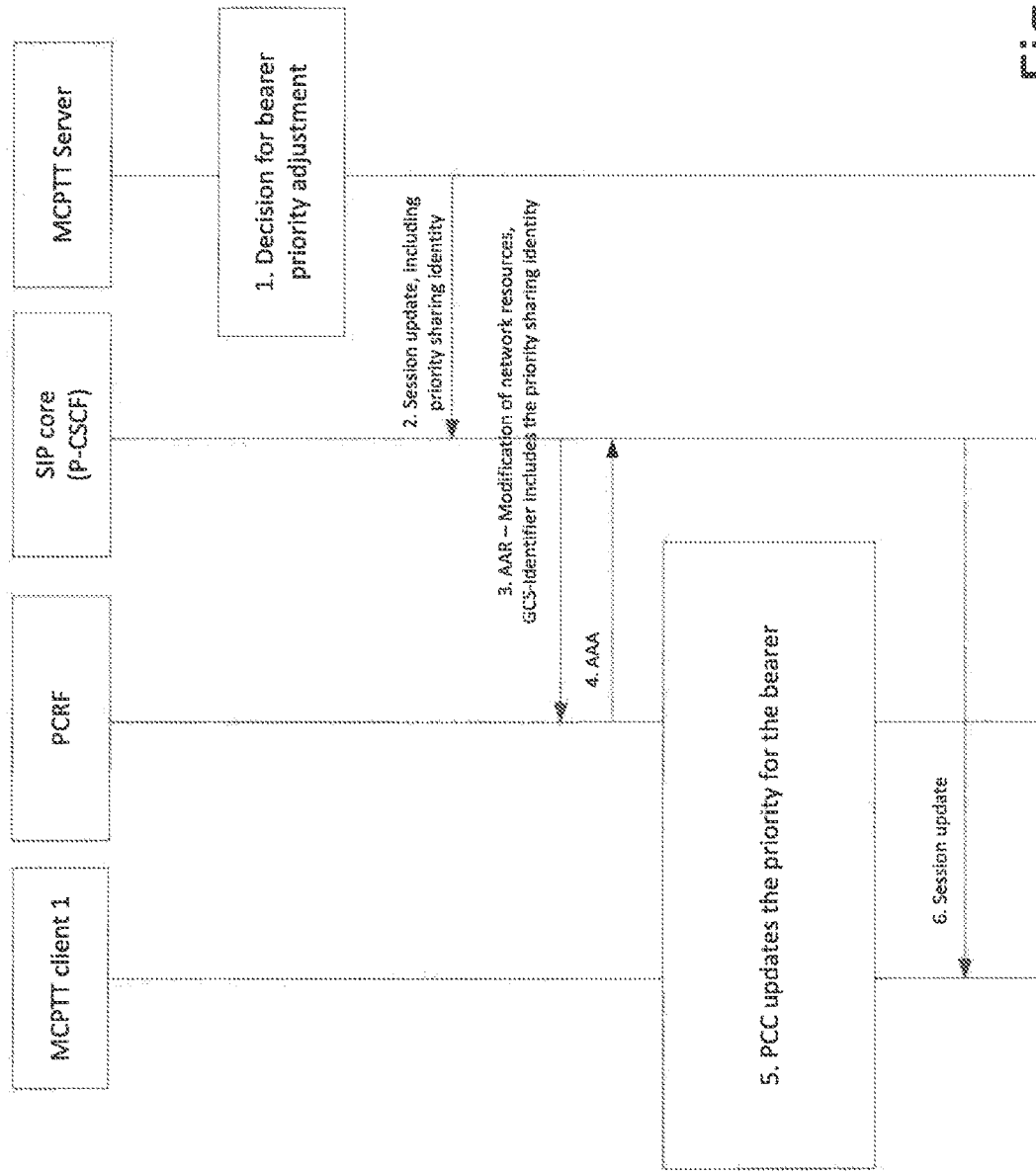
FIG. 12 schematically illustrates signaling in a communications network implementing priority handling of data flows.

FIG. 12 schematically illustrates signaling in a 3GPP-defined communications network implementing priority handling of data flows according to the present technique.

As mentioned above, a wireless device can in some communication systems only have up to three unacknowledged mode data radio bearer (UM DRB) according to TS 36.331 v 12.7.0. This type of bearer is typically used for real time media, like the media in a MCPTT call. For example the VoLTE standard (IR.92) mandates the use of UM DRB for the media in a VoLTE call.

A use case example of this is, if one wireless device is involved in one VoLTE call, one MCVideo call and one MCPTT call all three available UM DRB will be used. If the MCPTT server starts an MCPTT emergency call the request for a bearer will fail, since the UE already has three UM DRB active.

One way to handle this, as proposed herein, is to allow MCPTT calls to share a common EPS bearer priority. The bearer is then configured with a priority which is set to the highest requested priority of the MCPTT calls for one wireless device (or on the specific bearer as such). One use case could be the following:

Assume that an MCPTT client is affiliated to three MCPTT groups, and that there are ongoing calls on all groups. If one of the MCPTT group calls change status to emergency the bearer priority should be adjusted (see TS 23.179 v 1.0.0 sub clause 10.11). In this case a bearer modification request will be sent to the PCC, which should make sure that the EPS bearer that carries this MCPTT call and other identified MCPTT calls will get a priority adjustment. This function requires an enhancement of PCC.

This can be achieved by providing a priority sharing identifier, or priority sharing identity, in the resource request towards PCRF. The priority sharing identifier may be forwarded over Gx to PCEF. This priority sharing identity is used to identify all Service Data Flows (SDFs) within one bearer that may share a priority. Lower priority MCPTT calls will in this way have a free ride on an EPS bearer with higher priority; however that would be the cost of not rejecting an emergency call if all bearers are used. The MCPTT server should take this cost into account.

The information flow shown in FIG. 12 proposes an update of the PCC to support a shared priority among several SDFs in one EPS bearer. The SDFs are associated with each other with the priority sharing identity, which can be included in the GCS-Identity AVP in the Rx interface, as discussed above.

Also the default bearer should be upgraded with the same priority, according to the same principle of multimedia priority services.

The solution proposed herein does not introduce a limitation for MCPTT to use two or even three parallel UM DRB bearers with separate priority.

With reference to FIG. 12, assume that all previous resource requests from the MCPTT has included the same priority sharing identifier. The following sequence of events is illustrated in FIG. 12:

1. The MCPTT server decides that the priority of an ongoing call must be adjusted. An example of this is when a MCPTT group call is changed to an emergency call. See TS 23.179 v. 1.0.0 sub clause 10.11
2. The MCPTT server sends a session update request, e.g., a Session Initiation Protocol (SIP) re-invite or a SIP update) to the UE via the SIP core. This request will contain a priority sharing identifier used by the MCPTT server.
3. The Proxy function in the SIP core sends an AAR request to the PCRF over Rx to request for modified priority. The AAR request will include the priority sharing identity in the GCS-Identifier AVP over Rx. This AAR request is that discussed in connection to FIGS. 4 and 6.
4. The PCRF responds with an Authentication/Authorization Answer (AAA). This AAA was not explicitly mentioned in connection to FIGS. 4 and 6, but is a direct consequence of the PCRF receiving the AAR.
5. PCC updates the bearer priority for the bearer that contains the SDFs associated with the same priority sharing identifier as discussed above. The priority is set to highest priority (lowest ARP) among those SDFs. No additional bearer is created. Also the default bearer priority is updated accordingly.
6. The session update is forwarded to the MCPTT client.

In other words, a solution to address the problem of critical services getting rejected due to, e.g., EPS Bearer limitations in the wireless device is to introduce the possibility to share priority among SDFs associated to the same priority sharing identifier, i.e., sharing a priority identifier. With reference to FIG. 12, there is illustrated a method performed by a priority handling module in a communication network, i.e., PCC. The method comprises receiving a request for configuration or re-configuration of a priority rule associated with a data flow in the communications system, wherein the request comprises a priority sharing identifier, i.e., session update and AAR. The PCC updating of bearer priority, shown as event 5 in FIG. 12, is a result of calculating priority parameters of the communication system based on the received request, and identifying other data flows in the communication system which are associated with the priority sharing identifier, as well as determining a shared priority parameter based on the request for configuration or re-configuration and on an existing priority configuration of any identified other data flows in the communication system associated with said priority sharing identifier.

Exemplary Network Node

Figure 13:
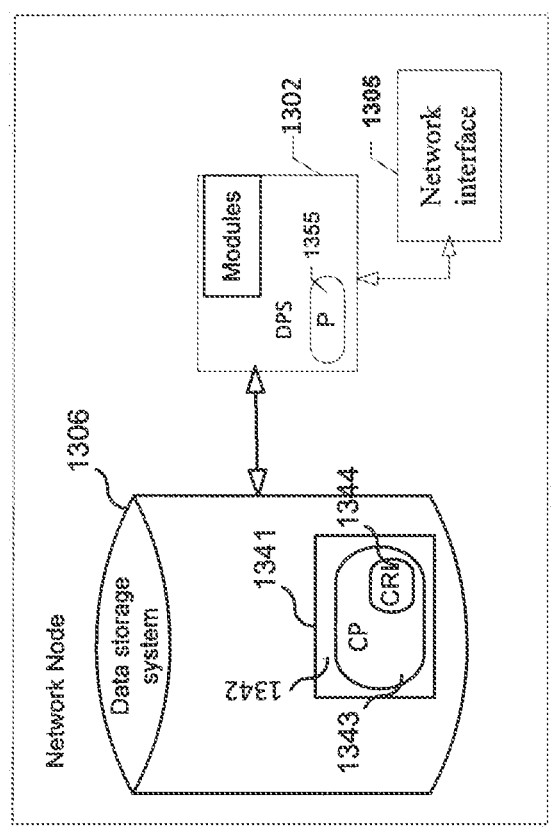
FIG. 13 schematically illustrates a network node according to aspects of the present disclosure.

FIG. 13 is a block diagram of an embodiment of a network node. As shown in FIG. 13, the network node may include: a computer system (CS) 1302, which may include one or more processors 1355 (e.g., a general purpose microprocessor and/or one or more other data processing circuits, such as an application specific integrated circuit (ASIC), field-programmable gate arrays (FPGAs), and the like); a network interface 1305 for use in connecting the network node to other network elements and communicating with other units connected to the network; and a data storage system 1306 for storing information (e.g., network slice information received from network management node (e.g., NM or DM), which may include one or more non-volatile storage devices and/or one or more volatile storage devices (e.g., random access memory (RAM)). In embodiments where computer system 1302 includes a general purpose microprocessor, a computer program product (CPP) 1341 may be provided. CPP 1341 includes a non-transitory computer readable medium (CRM) 1342 storing a computer program (CP) 1343 comprising computer readable instructions (CRI) 1344. CRM 1342 may be a non-transitory computer readable medium (i.e., magnetic media (e.g., a hard disk), optical media (e.g., a DVD), flash memory, and the like). In some embodiments, the CRI 1344 of computer program 1343 is configured such that when executed by data processing system 1302, the CRI causes the computer system to perform steps described herein. In other embodiments, computer system 1302 may consist merely of one or more ASICs. Hence, the features of the embodiments described herein may be implemented in hardware and/or software.

The invention claimed is:

1. A system for priority handling, the system comprising:
a Policy and Charging Rules Function (PCRF) comprising a receiver, a transmitter, and processing circuitry, wherein the PCRF is configured to:
process a received request message, the request message identifying a first call involving a wireless device and containing priority sharing information;
obtain the priority sharing information from the received request message, wherein the priority sharing information indicates whether or not the first call is allowed to share a priority with certain other calls involving the wireless device, wherein the first call and each said other call has an Allocation and Retention Priority (ARP) value;
determine that the priority sharing information indicates that the first call is allowed to share a priority with said other calls;
as a result of determining that the priority sharing information indicates that the first call is allowed to share a priority with said other calls, then, for the first call and each said other call, identify the call's ARP value;
determine, among said identified ARP values, the lowest identified ARP value; and
enable the first call and each said other call to share an Evolved Packet System (EPS) bearer by, for each call having an ARP value greater than the lowest identified ARP value, modifying the ARP value for the call so that the modified ARP value is the same as the lowest identified ARP value.

2. The system according to claim 1, wherein the EPS bearer is a unicast EPS bearer.

3. The system according to claim 1, wherein the EPS bearer is a single logical connection between the wireless device and a gateway.

4. The system according to claim 1, wherein the system further comprises:
the SIP core, and
the server, wherein
the server is a Mission-Critical Push-to-Talk (MCPTT) server,
the MCPTT server is configured to determine whether the priority of a particular ongoing call must be adjusted and to send to the SIP core a session update as a result of determining that the priority of the ongoing call must be adjusted, and
the SIP core is configured to transmit to the PCRF the request message after receiving the session update sent by the MCPTT server.

5. The system of claim 1, wherein the system is further configured to update a priority of a default bearer in response to the request message.

6. A method in a communication network, the method comprising:
a priority handling module receiving a request message, the request message identifying a first call involving a wireless device and containing priority sharing information;
obtaining the priority sharing information from the received request message, wherein the priority sharing information indicates whether or not the first call is allowed to share a priority with certain other calls involving the wireless device, wherein the first call and each said other call has an Allocation and Retention Priority (ARP) value;
determining that the priority sharing information indicates that the first call is allowed to share a priority with said other calls;
as a result of determining that the priority sharing information indicates that the first call is allowed to share a priority with said other calls, then, for the first call and each said other call, identifying the call's ARP value;
determining, among said identified ARP values, the lowest identified ARP value; and
enabling the first call and each said other call to share an Evolved Packet System (EPS) bearer by, for each call having an ARP value greater than the lowest identified ARP value, modifying the ARP value for the call so that the modified ARP value is the same as the lowest identified ARP value.

7. The method according to claim 6, wherein the EPS bearer is a unicast EPS bearer.

8. The method according to claim 6, wherein the EPS bearer is a single logical connection between a push-to-talk (PTT) client and a gateway.

9. The method according to claim 6, wherein the priority handling module comprises a Policy and Charging Rules Function (PCRF).

10. The method according to claim 9, further comprising:
a Mission-Critical Push-to-Talk (MCPTT) server determining whether the priority of the first call must be adjusted; and
the MCPTT server sending to a SIP core a session update as a result of determining that the priority of the ongoing call must be adjusted, wherein the SIP core transmits the request message after receiving the session update sent by the MCPTT server.

11. The method according to claim 10, wherein determining whether the priority of the first call must be adjusted comprises determining whether the first call is changed to an emergency call.

12. The method according to claim 10, further comprising the SIP core forwarding the session update to an MCPTT client.

13. The method according to claim 6, further comprising updating a priority of a default bearer as a result of receiving the request message.

14. A non-transitory computer readable medium storing comprising computer program code which, when executed on one or more processors in a network node of a communication system, causes the communication system to execute a method according to claim 6.

15. A network node configured to perform priority handling in a communication network, the network node comprising:
a receiver for receiving a request message, the request message identifying a first call involving a wireless device and containing priority sharing information; and
a processor configured to:
obtain the priority sharing information from the received request message, wherein the priority sharing information indicates whether or not the first call is allowed to share a priority with certain other calls involving the wireless device, wherein the first call and each said other call has an Allocation and Retention Priority (ARP) value;
determine that the priority sharing information indicates that the first call is allowed to share a priority with said other calls;
as a result of determining that the priority sharing information indicates that the first call is allowed to share a priority with said other calls, then, for the first call and each said other call, identify the call's ARP value;
determine, among said identified ARP values, the lowest identified ARP value; and
enable the first call and each said other call to share an Evolved Packet System (EPS) bearer by, for each call having an ARP value greater than the lowest identified ARP value, modifying the ARP value for the call so that the modified ARP value is the same as the lowest identified ARP value.

16. The network node according to claim 15, wherein the network node is arranged to execute a Policy and Charging Rules Function (PCRF).

17. The network node according to claim 16, wherein the EPS bearer is a unicast EPS bearer.

18. The network node according to claim 15, wherein the EPS bearer is a single logical connection between the wireless device and a gateway.

19. The network node according to claim 15, wherein the network node is further configured to update a priority of a default bearer in response to the request message.

* * * * *

UNITED STATES PATENT AND TRADEMARK OFFICE
CERTIFICATE OF CORRECTION

PATENT NO. : 10,623,936 B2
APPLICATION NO. : 15/088528
DATED : April 14, 2020
INVENTOR(S) : Trank et al.

Page 1 of 1

It is certified that error appears in the above-identified patent and that said Letters Patent is hereby corrected as shown below:

In the Specification

In Column 7, Line 60, delete "FTT" and insert -- PTT --, therefor.

In Column 7, Line 65, delete "G2, which" and insert -- G2, in which --, therefor.

In Column 13, Line 35, delete "is that" and insert -- is --, therefor.

Signed and Sealed this
Fourth Day of August, 2020

Andrei Iancu
*Director of the United States Patent and Trademark Office*